March 18, 1941. A. GRUMBT 2,235,365
FUEL INJECTION VALVE FOR INTERNAL COMBUSTION ENGINES
Filed May 21, 1938
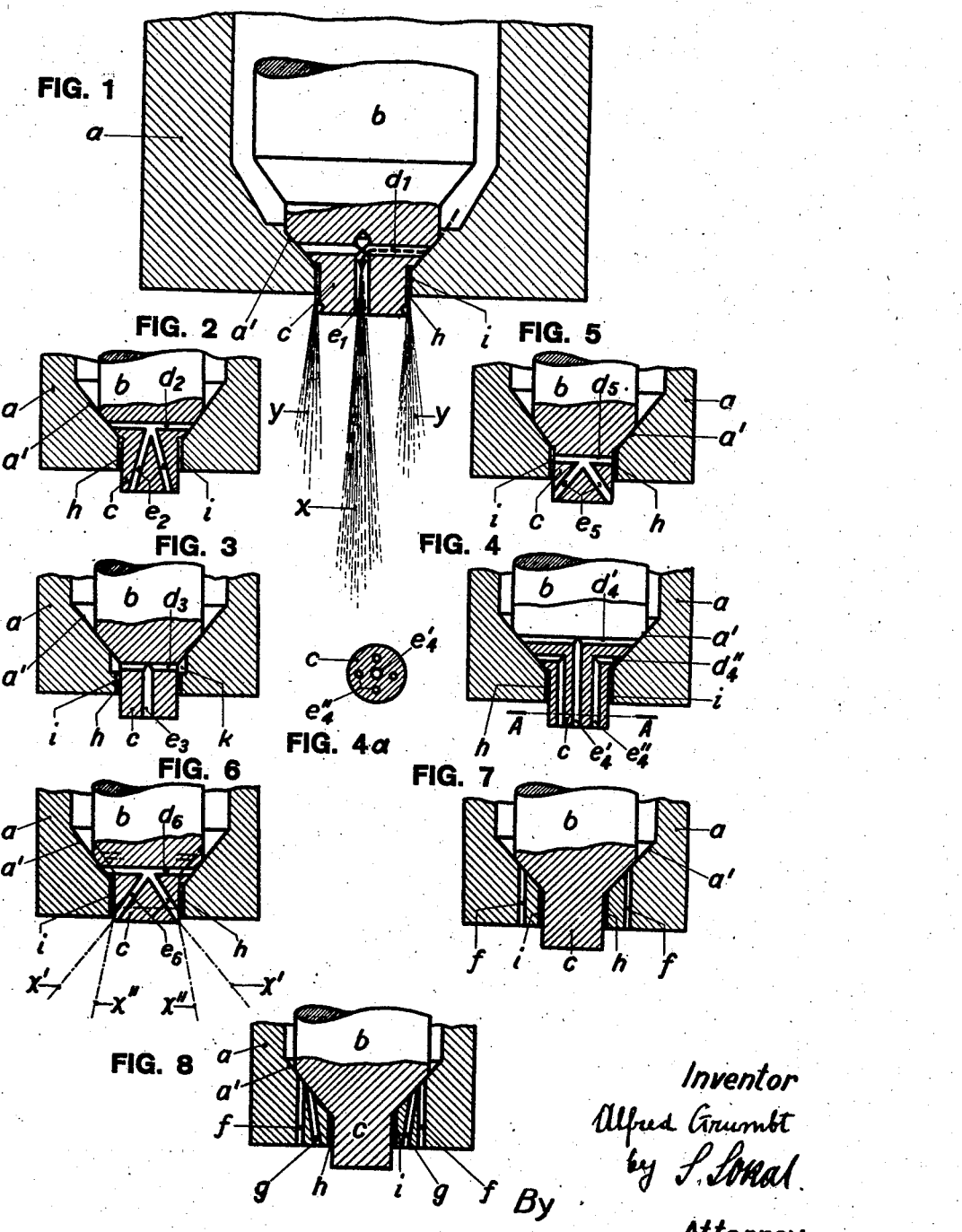

Patented Mar. 18, 1941

2,235,365

UNITED STATES PATENT OFFICE 2,235,365

FUEL INJECTION VALVE FOR INTERNAL COMBUSTION ENGINES

Alfred Grumbt, Kassel, Germany, assignor to Henschel & Sohn Gesellschaft mit beschrankter Haftung, Kassel, Germany Application May 21, 1938, Serial No. 209,214
In Germany May 24, 1937

1 Claim. (Cl. 299—107.6)

Application has been filed in Germany May 24, 1937.

The present invention relates to fuel injection valves for internal combustion engines, more particularly Diesel engines, of the pin or plug type. Valves of this type are usually fluid-controlled and they are provided with a pin or plug-like projection which does not tightly fit the corresponding port in which the pin or plug is located. In valves of this type the fuel issues through the annular space between the pin or plug and the corresponding opening, upon lifting of the valve.

The combustion in a Diesel engine depends to a large extent upon the shape of the combustion space which is a characteristic feature of the various methods of injection now in use, and it depends also to a very high degree upon the way in which the fuel is injected both as regards the time of the injection and the shape of the jet. Various types of injection pumps and means for operating such pumps, such as tappets and cams, overflow valves and nozzle forms are known, which enable by the provision of various kinds of bores varying as regards diameter, direction, edge baffles and so on, and by the use of various kinds of valve needles having ordinary valve seats or pin or plug-like projections, to produce various kinds of jets. In all these known arrangements, the jet comprises a very pronounced principal jet form which determines the nature of the injection, there being practically no secondary or subsidiary jets.

It is the object of the present invention to provide means for very accurately determining ignition and combustion, whilst employing for this purpose one nozzle only fulfilling all the required functions. According to the invention a valve of the plug or pin type is provided with one or more additional injection ports which are opened and closed by the valve simultaneously with the annular port contained between the pin or plug of the valve and the opening in which the pin or plug is located. If these additional ports or bores of the pin or plug are arranged centrally or in some other suitable manner with regard to the usual annular port, and if the pin or plug of the valve moving in the main bore of the valve seat is sufficiently long, the fuel will issue through the annular space around the pin or plug in the form of a cylindrical, or rather, slightly conical veil or screen of rather moderate penetrating force, but the issue of this annular jet of moderate penetrating force will be preceded by the issue of a strong central jet inside the annular jet, or one or more jets exterior to the annular jet and more or less surrounding the latter.

Several constructional forms of the invention are illustrated by way of example in the accompanying drawing.

Fig. 1, which is drawn to an enlarged scale, is a fragmentary sectional elevation of one construction of the improved valve.

Fig. 2 shows a second construction in fragmentary sectional elevation.

Fig. 3 shows a third construction in fragmentary sectional elevation.

Fig. 4 shows a fourth construction in fragmentary sectional elevation.

Fig. 4a is a section on line A—A of Fig. 4.

Fig. 5 shows a fifth construction in fragmentary sectional elevation.

Fig. 6 shows a sixth construction in fragmentary sectional elevation.

Fig. 7 shows a seventh construction in fragmentary sectional elevation, and

Fig. 8 shows an eighth construction in fragmentary sectional elevation.

In all the drawing $a$ indicates the casing or housing of the valve, having a valve seat $a'$ and $b$ indicates a valve usually called a nozzle needle, having a pin or plug-like projection $c$ at its lower end, and also having bores or ports generally indicated by the letters $d$ and $e$. The bores or additional ports in the valve casing or housing are indicated generally by the letters $f$ and $g$. $h$ indicates in all of the drawing, the annular space between the pin or plug $c$ and the corresponding bore $i$ in the body or casing $a$.

Referring first to Fig. 1, the pin $c$ of the needle $b$ is provided with a transverse bore $d1$ terminating at the valve seat $a'$ and communicating with a central bore $e1$ which opens into the combustion space. The operation of this construction is as follows:

Upon the needle valve $b$ being lifted, the openings of the transverse bore $d1$ in the plug $c$ are uncovered. As the passage constituted by the bores $d1$ and $e1$ offers a lesser resistance to the fuel than the annular space $h$ between the pin $c$ and the bore $i$ and is moreover nearer to the admission of the fuel from the pump, the fuel will issue sooner and in the form of a stronger jet through the bore $e1$ than through the annular clearance, this being indicated in Fig. 1 by the jets X and Y. It is the object of the invention to cause the fuel to issue in the form of these two jets of different penetrating force.

In the construction according to Fig. 2, the pin $c$ is again provided with a transverse bore $d2$ opening at the conical valve seat $a'$, but this bore, in this construction, is in communication with two inclined bores $e2$, $e2$ communicating with the combustion space. The operation is similar to that of the construction shown in Fig. 1 except that owing to the inclined position of the bores $e2$, $e2$, the strong inner jets are directed outwardly.

In the construction according to Fig. 3 the transverse bore $d3$ is connected with a central bore $e3$, which latter is in communication with the combustion space, but the bore $d3$ opens into an annular space $k$ between the lower end of the conical valve seat $a'$ of the needle $b$ and the annular space $h$. The operation of this construction is similar to that shown in Fig. 1.

The construction shown in Figs 4 and 4a shows two groups of transverse bores $d'4$ and $d''4$ both of which open at the conical valve seat $a'$. The bores $d''4$ communicate with bores $e''4$ whilst the bores $d'4$ communicate with a central bore $e'4$. This is clearly shown in Fig. 4a. The operation is similar to that previously described in connection with Fig. 1, except that instead of one strong middle jet, there are several jets within the annular jet. This construction particularly facilitates mixing of the fuel with air.

The construction according to Fig. 5 shows a transverse bore $d5$ and inclined bores $e5$, $e5$ similar to those shown in Fig. 2, but the bore $d5$ does not open at the valve seat $a'$ but into the main bore $i$. Moreover, the inclined bores $e5$ terminate at the outer edge of the pin $c$. In this construction too, the bores $d5$, $e5$, $e5$ offer a lesser resistance to the passage of the fuel than the annular space $h$ and therefore fuel will issue through these bores slightly before it issues through the annular space.

In the construction according to Fig. 6, the pin $c$ is somewhat shorter than in the previously described constructions. The additional bores $d6$ and $e6$ are similar to those shown in Fig. 5. The particular feature of this construction is the fact that at the commencement of the lift of the needle $b$ the fuel will issue first in a direction approximately indicated by the lines $X'$, whilst when the valve $b$ is completely lifted as indicated by dotted lines, the fuel will issue substantially in the direction indicated by the lines $X''$. Owing to the partial overlapping of the discharge openings of the bores $e6$ the jet is slightly diverted inwardly.

In the construction shown in Fig. 7, the additional bores are not provided in the plug $c$ but in the body of the seat and are designated by $f, f$. They run parallel to the axis of the needle and communicate at one end with the seating surface $a'$ and at the other end with the combustion space. The operation is similar to that previously described except that the strong jets issuing from the bores $f$ enclose the weaker annular jet issuing from the space $h$.

In the construction shown in Fig. 8 which is similar to that shown in Fig. 7 there are provided in addition to the bores $f$ further bores $g$, both bores $f$ and $g$ being arranged around the annular jet. The bores $g$ are inwardly inclined, but it may be pointed out that in some cases either bores $f$ or $g$ might be outwardly inclined.

It may also be pointed out that the features of the constructions according to Figs. 2 to 6 and those of the constructions according to Figs. 7 and 8 may be combined.

The shape of the pin or plug $c$ forming the extension of the needle $b$ need not be as shown. The bores $e$, $f$ and $g$ may, in order to give the jets a rotary motion, be provided with suitable grooves or projections of helical or like shape. The lower edges of the plug $c$ as well as the lower ends of the ports $e1$, $e2$, $e3$, $e4$, $f$ and $g$ may be provided with the usual means for giving the fuel a rotary or other suitable motion facilitating atomisation or rotation.

I claim:

In a fluid controlled needle valve for the injection of fuel into an internal combustion engine, the combination of: a housing formed with a valve seat and a main bore and an annular recess located between the lower end of the valve seat and said main bore; a needle valve having a surface resting in the closed position of the valve upon said valve seat and also having a pin-like extension at its lower end located in said main bore and of slightly lesser diameter than the bore so as to leave an annular clearance in all positions of the needle valve and through which, upon lifting of the valve, fuel issues in the form of an annular jet; and an additional fuel port so constructed and arranged as to open and close upon the lifting and lowering of the needle valve, said additional port consisting of a transverse bore in the needle valve communicating with said annular recess and a further bore in said needle valve communicating with the transverse bore and opening at the lower surface of the pin.

ALFRED GRUMBT.